United States Patent Office 2,702,790
Patented Feb. 22, 1955

2,702,790

INHIBITING DEGRADATION OF QUEBRACHO DRILLING FLUIDS

Charles F. Teichmann, Crestwood, and Clifford G. Ludeman, Scarsdale, N. Y., assignors to Texaco Development Corporation, New York, N. Y., a corporation of Delaware No Drawing. Application April 2, 1952,
Serial No. 280,192

7 Claims. (Cl. 252—8.5)

The present invention relates to the subsurface drilling of wells or bore holes into underground formations and particularly to the drilling fluids or muds employed in such operations.

More specifically the invention concerns drilling operations involving a continuous circulation of such drilling fluids or muds downwardly through the drill stem, to and about the bit of a rotary drilling rig and thence upwardly in the space between the drilling stem and the walls of the bore hole for the purpose of tapping underground reservoirs of oil, gas, brine or water. In this operation, the drilling fluid serves to lubricate the drill stem and the bit, to transport cuttings to the surface, to seal and hold in place the traversed walls of the bore hole, to impose a hydrostatic head upon the formation preventing the escape of high pressure fluids into the bore hole, and to perform numerous other functions.

The present invention is specifically applicable to such operations employing a water base drilling fluid or mud which, in addition to the usual suspension of clay, weighting agent and other typical mud constituents, depends upon small additions of a plant tannin extract such as quebracho for the purpose of controlling mud properties. The tannins, which term is meant to include the alkaline reaction products which result from addition of the extract to an alkaline mud, function as thinners to control the viscosity and thixotropy of the mud and are believed to act through a dispersive effect upon the gel structure of the mud. Apart from the viscosity modifying effect, the foregoing plant tannin derivatives exert another important effect in decreasing the fluid loss which results from mud filtration at the walls of the bore hole. Also, they tend to increase the strength and toughness of the filter cake formed on the walls of the bore hole as the result of such mud filtration. As above intimated, they are effective in relatively small proportions, as for example, 0.5–5.0 pounds per barrel of mud which, however, depends upon the specific mud to be treated, and is critical from the standpoint that their employment in substantial excess, known as "overloading," may be detrimental.

In accordance with the present invention, all of the effective mud modifying properties of the plant tannin herein referred to as its "dispersive effect" or "dispersive properties" are protected or inhibited against deterioration in the drilling fluid by the presence of small, protective amounts of an organic inhibitor comprising benzene substituted by two substituents selected from the group consisting of hydroxy and amino radicals and located in relative positions capable of quinonoidal oxidation. The amino radical may be mono-substituted by alkyl, aralkyl, aryl, as for example, methyl, ethyl, cyclohexyl, benzyl or phenyl groups and the like, and preferably contains not more than eight carbon atoms.

More specifically the inhibitors contemplated herein include, for instance, the para and ortho dihydroxybenzenes, such as hydroquinone and catechol, ortho and para aminophenols, and both the ortho and para phenylenediamines, all of which comprise the preferred class in accordance with the present invention. The broad class under the present invention, however, includes the trihydroxy substituted benzenes such as pyrogallol. In each case the relative location of the several hydroxy and/or amino substituents provides the quinonoid-forming type of structure which is the distinguishing structural characteristic of the foregoing protective agents or inhibitors capable of protecting quebracho and equivalent tannin dispersants against undesired degradation.

By "quinonoid-forming type of structure" or "capable of quinonoidal oxidation" is meant the relative disposition of the foregoing substituents with respect to the benzene nucleus, such that the compound oxidizes to form a quinonoid structure. As is known, oxidation of the substituent groups, in such quinonoid-forming compounds, results in alteration of their original monovalent linkage with the benzene nucleus, to a divalent linkage, with the simultaneous rearrangement of the nucleus to the quinonoid form.

The present invention follows from the discovery that, in solution in a typical drilling fluid, particularly in the presence of caustic or other alkaline material, the tannin dispersant undergoes progressive deterioration, presumably due to oxidation with an accompanying loss of dispersive properties.

More specifically, solutions of quebracho have been found to decrease in mud modifying effectiveness upon contact with oxygen, such as dissolved air, ultimately becoming relatively ineffective from the standpoint of mud viscosity modification, suppression of fluid loss and other desired characteristics, herein referred to as the dispersive properties.

For example, a caustic-quebracho mud treating solution comprising 10 gms. of quebracho extract, 5 gms. of caustic soda and 100 ml. of water was aerated for a period of three weeks, and periodically tested for oxygen absorbing rate in a Burrell gas analyzer. In the initial absorption test the freshly prepared solution completely absorbed a test volume of oxygen in approximately 40 passes. However, after 24 hours aeration, only about 3% of the test volume of oxygen was absorbed after 60 passes through the solution, and, after three weeks of further aeration, the oxygen absorbing capacity of the solution was further decreased. These results indicate, therefore, a progressive absorption of the oxygen by the caustic-quebracho solution approaching an ultimate condition of saturation.

To determine the effect of oxygen absorption upon the properties of the plant tannin dispersant, one portion of the above treating solution was stored in a sealed, airtight container, whereas the second portion was placed in a gas absorption container and subjected to aeration with a flow of air at the rate of 0.7–1.0 cubic feet per hour per 100 ml. of solution. After 16 days of aeration the sample was made up to the original volume with water and tested, in comparison with the non-aerated sample, as a mud treating agent by addition to a P-95 drilling mud.

The results of these tests demonstrated a profound reduction in the dispersive effect of the aerated quebracho solution. For example, in the filtration tests, the aerated caustic-quebracho in all cases caused an actual increase in the rate of mud filtration loss by the standard A. P. I. filtration loss test, indicating an essentially complete destruction of the water loss modifying properties of the quebracho. In contrast the quebracho stored in the sealed container remained equally as effective as fresh quebracho as regards decreasing the water loss.

The deflocculating power of the aerated caustic-quebracho solution likewise evidenced substantial impairment. For example, the following table lists the modification in viscosity of the foregoing mud treated respectively with the aerated and non-aerated solutions:

| Caustic Quebracho Treating Solution | Quebracho, lb./bbl. mud | Percent change of Stormer viscosity at 600 R. P. M. |
|---|---|---|
| Aerated | 1.75 | −9.3 |
| Do | 3.50 | −5.8 |
| Non-aerated | 1.75 | −42.2 |
| Do | 3.50 | −56.8 |

Manifestly, therefore, the dispersive effect of the tannin component is seriously impaired by aeration in aqueous solution, particularly in the presence of caustic.

In accordance with the present invention, it has been discovered that the foregoing deterioration of the plant tannin dispersant, which occurs in aqueous fluids such as drilling muds or treating fluids is overcome or inhibited by the presence of relatively small quantities of the foregoing protective agents, the dispersant therefore maintaining its desired properties over increased periods of time.

Accordingly, the primary advantage of the present invention resides in overcoming the deterioration of the vegetable tannin products and loss of the dispersant properties so that the amount of tannin extract required for mud formation and maintenance is minimized and the process of drilling is accordingly rendered more economical. This advantage is enhanced by the fact that the aforesaid protective agents are effective in relatively small concentrations. Such concentrations are of the order of about 0.01 to 1.0 mol per cent of inhibitor per pound-mol of tannin dispersant. In the case of pure tannin this amounts to about 0.000006 to 0.0007 pound of inhibitor per pound of dispersant, and results from the high molecular weight of tannin. However, it appears the addition of the plant tannin material to the typical aqueous, alkaline drilling fluid inherently yields additional decomposition products of lower molecular weight which are, at least in part, responsible for the valuable dispersing effect realized. Since it is evident from the foregoing data that active dispersant material, whatever its form, is progressively deteriorated upon atmospheric exposure, in aqueous, alkaline solution, it follows that somewhat higher concentrations of inhibitor are advantageous for optimum protection. Therefore, it is preferred to observe concentrations of about 0.001–0.1 lb. of inhibitor per pound of tannin.

Nevertheless, an appreciable and valuable protective effect is also realized at concentrations as low as 0.00001 lb. per pound of dispersant. Likewise, somewhat increased concentrations above optimum are not ordinarily detrimental to the drilling fluid. Manifestly, however, since there is no advantage in the use of an excess of protective material, the smaller concentrations are preferred in the interest of operating economy. Broadly, therefore, it is contemplated employing the present organic inhibitors in aqueous drilling fluids in a concentration of from the lowest value mentioned, up to about 0.25 lb. per pound of the tannin extract which is added to the fluid to confer the desired mud properties.

It is also contemplated currently replenishing the protective agent to allow for mud loss and mud contamination as well as consumption of the protective agent which takes place during drilling. For example, relatively small quantities may be admixed with the mud at suitable operating intervals as required. Since the extent of mud contamination or of mud loss or the severity of the conditions leading to tannin deterioration are not normally predictable, it is preferable merely to maintain a current, effective concentration of the inhibitor in the mud, as for example a concentration equivalent to about 0.001–0.1 pound per pound of tannin. Ordinarily, current maintenance of such a concentration will assure the continuance of the desired mud properties. Also, since the requirement for supplemental addition of protective material is reflected by deterioration in the dispersing effect, for example, supplemental additions of both dispersant and protective agent may be made in response to a detectible viscosity reduction or increase in mud filtration loss.

As above intimated, the protective agents do not exhibit any appreciable flocculating or other undesirable effect upon the mud constituents in the low concentrations at which they are capable of protecting the dispersant. They may, moreover, be added to the mud during its formulation or subsequent modification without exercising any special precautions. That is to say, many additive materials, in a localized excess concentration, adversely affect the mud and must be incorporated in minute increments to avoid temporary, excessively high concentrations at the point of introduction. In contrast, the present agent may be added in a localized excess and thereafter permitted to admix gradually with the mud during circulation to realize the desired overall concentration. Obviously, this is particularly advantageous in field operations where facilities for precise compounding are not always advisable or necessary. Moreover, it enables the use of deliberate excess of protective material when extended periods of operation without mud readjustment are desired.

It is also contemplated preparing a separate admixture of the inhibitor with the tannin extract prior to mud preparation, thus providing a commercial, protected, or inhibited dispersant and avoiding the separate addition of the protective material to the drilling fluid in the field. In such cases, the material is simply brought into admixture with a plant tannin extract such as quebracho in the above indicated proportions, as for example about 0.001–0.1 pound per pound of plant tannin extract and supplied as such to the location of the mud preparation or compounding, the addition of the quebracho in the amount required to effect the desired mud modification, simultaneously serving to overcome the degradation of the additive quebracho.

As above intimated, the present invention is applicable to water base drilling muds, in general, which are typically formulated as a suspension of common clays together with such drilling clays as bentonite, weighting agents, such as barytes and iron oxide and many other conventional additives. The solid constituents, as is known, are usually in the form of finely divided particles suspended in the aqueous phase.

Ordinarily, the drilling fluid is rendered alkaline by the addition of caustic, sodium silicate or the like, and may range from the low alkalinity muds having a pH about 7 to 9 to relatively high alkalinity muds with pH values ranging upwardly from pH 9.0 and frequently as high as 11.0 to 12.5. As previously indicated, it is in connection with the high pH muds that the present invention is particularly effective, due to the accelerated decomposition of the tannin dispersant which tends to occur under conditions of strong alkalinity.

The invention is also applicable to drilling fluids containing starchy and proteinaceous materials incorporated to improve the wall forming characteristics and increase resistance of fluid through the filter cake deposited by the mud on the formation surfaces along the bore hole.

One typical example of a drilling fluid conforming to the present invention, comprises the P–95 mud, above mentioned, a high quality mud from Rosamond, California, to which is added about 1.8 pounds of quebracho extract, 0.9 pound of caustic soda, and 0.02 pound of hydroquinone, per barrel of mud.

The additives may be incorporated into the drilling fluid by means of a mixing gun at the mud pit or by any other procedure effective to cause the desired mixing. The mud remains stable at its compounded viscosity and filtration water loss over long periods of atmospheric exposure.

The present invention is also applicable to tannin containing aqueous drilling fluids, which, in addition to, or in place of, suspended, solid particles, include a dispersed oil phase formed of any suitable fraction of crude or refined oil emulsified in the aqueous phase in accordance with known practice. Dispersions of the aqueous phase in the oil phase are also contemplated.

In general, therefore, the invention comprehends stabilizing the effective properties of plant tannin materials in any drilling fluid comprising water, particularly under conditions of substantial alkalinity.

Expressions such as "plant tannin extracts" and "plant tannin materials," as used herein, are intended to include quebracho extract as well as such forms as the quebracho may take in drilling fluids, particularly under alkaline conditions. Since, however, the desired dispersant properties are dependent upon the tannin constituents of the extract, the terms as used herein mean also the other and equivalent plant tannin extracts and derivatives, as, for example, chestnut, divi-divi, gambier, hemlock, quercitron, osage, and the like, as well as tannic acid and gallic acid salts normally occurring as constituents of the drilling mud, as the result of addition thereto of the plant tannin derivative.

Obviously, many modifications and variations of the invention as hereinbefore set forth may be made without departing from the spirit and scope thereof, therefore, only such limitations should be imposed as are indicated in the appended claims.

We claim:

1. In the drilling of a well bore through subsurface ground formations with a rotary drill wherein an aqueous, alkaline drilling fluid is continuously circulated through the drill stem and about the bit of a rotary drill rig, said drilling fluid containing a viscosity-controlling additive of the class consisting of the plant tannin materials, the improvement which comprises circulating an aqueous alkaline drilling fluid containing a small quantity of an organic inhibitor comprising a benzene nucleus substituted by at least two substituents selected from the group consisting of hydroxy and unsubstituted amino radicals and amino radicals mono-substituted by a radical selected from the group consisting of alkyl, aralkyl and aryl radicals containing not more than 8 carbon atoms, said substituent groups being located in relative positions capable of quinonoidal oxidation, said inhibitor being present in sufficient amount to inhibit deterioration of the viscosity-controlling properties of said plant tannin materials contained in said drilling fluid.

2. The method according to claim 1 wherein said organic inhibitor is present in said drilling fluid in an amount ranging from about 0.0006 to about 0.1 pound per pound of plant tannin material.

3. In the drilling of a well bore through subsurface ground formations with a rotary drill wherein an aqueous, alkaline drilling fluid is continuously circulated through the drill stem and about the bit of a rotary drill rig, said drilling fluid containing a viscosity-controlling additive of the class consisting of the plant tannin material, the improvement which comprises circulating an aqueous alkaline drilling fluid containing a small quantity of an organic inhibitor comprising a benzene nucleus substituted by at least two substituents selected from the group consisting of hydroxy and amino radicals disposed in quinonoid-forming positions with respect to the benzene nucleus, said inhibitor being present in sufficient amount to inhibit deterioration of the viscosity-controlling properties of said plant tannin materials contained in said drilling fluid.

4. An aqueous, alkaline drilling fluid for drilling subsurface formations with a rotary drill, said drilling fluid composition comprising a plant tannin material having associated therewith an organic inhibitor comprising a benzene nucleus substituted by at least two substituents selected from the group consisting of hydroxy and unsubstituted amino radicals and amino radicals mono-substituted by a radical selected from the group consisting of alkyl, aralkyl and aryl radicals containing not more than 8 carbon atoms, and said substituents being located in relative positions capable of quinonoidal oxidation, said inhibitor being present in sufficient amount to inhibit deteroration of the viscosity-controlling properties of said plant tannin materials.

5. The composition according to claim 4 wherein the said organic inhibitor is present in a proportion amounting to about 0.001 to 0.1 pound per pound of plant tannin material.

6. A composition effective as a drilling fluid modifier in boring subsurface formations by means of a rotary drill employing a continuously circulating drilling fluid, said composition comprising a plant tannin material having associated therewith a substantial proportion of an organic inhibitor comprising a benzene nucleus substituted by at least two substituents selected from the group consisting of hydroxy and unsubstituted amino radicals and amino radicals mono-substituted by a radical selected from the group consisting of alkyl, aralkyl and aryl radicals containing not more than 8 carbon atoms, and said substituents being located in relative positions capable of quinonoidal oxidation, said inhibitor being present in sufficient amount to inhibit deterioration of the viscosity-controlling properties of said plant tannin materials.

7. A composition in accordance with claim 6 wherein said organic inhibitor is present in an amount equal to about 0.001 to 0.1 pound per pound of plant tannin material.

References Cited in the file of this patent

UNITED STATES PATENTS

| 2,555,265 | Bergman | May 29, 1951 |
| 2,560,930 | Campise | July 17, 1951 |

FOREIGN PATENTS

| 181,365 | Great Britain | July 26, 1923 |